US009866082B2

United States Patent
Cao et al.

(10) Patent No.: US 9,866,082 B2
(45) Date of Patent: Jan. 9, 2018

(54) ROTOR AND A MOTOR AND COMPRESSOR COMPRISING THE ROTOR

(71) Applicant: Emerson Electric Co., St. Louis, MO (US)

(72) Inventors: Pingshan Cao, Suzhou (CN); Xin Li, Suzhou (CN); Xin Li, Suzhou (CN); Yan Zhuang, Suzhou (CN)

(73) Assignee: Emerson Electric Co., St. Louis, MO (US)

( * ) Notice: Subject to any disclaimer, the term of this patent is extended or adjusted under 35 U.S.C. 154(b) by 83 days.

(21) Appl. No.: 14/163,284

(22) Filed: Jan. 24, 2014

(65) Prior Publication Data

US 2014/0203674 A1 Jul. 24, 2014

(30) Foreign Application Priority Data

Jan. 24, 2013 (CN) .......................... 2013 1 0043366

(51) Int. Cl.
*H02K 9/19* (2006.01)
*H02K 1/32* (2006.01)
(Continued)

(52) U.S. Cl.
CPC ............... *H02K 1/32* (2013.01); *H02K 1/276* (2013.01)

(58) Field of Classification Search
CPC ............. H02K 9/19; H02K 1/276; H02K 1/32
(Continued)

(56) References Cited

U.S. PATENT DOCUMENTS 5,889,342 A * 3/1999 Hasebe .................... H02K 9/19
310/156.19
6,450,785 B1 * 9/2002 Dellby ................ F04B 39/0261
184/6.16
(Continued)

FOREIGN PATENT DOCUMENTS

| JP | 2007-104888 | * | 4/2007 |
| JP | 2012-050331 | * | 3/2012 |
| WO | WO 2012/101328 | * | 8/2012 |

OTHER PUBLICATIONS

English machine translation for JP 2007-104888.*
(Continued)

*Primary Examiner* — Dang Le
*Assistant Examiner* — Ahmed Elnakib
(74) *Attorney, Agent, or Firm* — Harness, Dickey & Pierce, P.L.C.

(57) ABSTRACT

The invention relates to a rotor and a motor and compressor comprising the rotor. The rotor comprises a rotor core defining an outer periphery, a bore concentric with a center of the rotor core, a plurality of magnet slots positioned on the outer periphery, and a plurality of oil holes located radially outward from the center between the bore and the magnet slots. Each oil hole includes a body portion and at least one projected portion. The projected portions are located radially outward from the body portions and positioned between the body portions and the magnet slots. The projected portions may increase the contact area of the compressor oil with the rotor core to effectively cool down the rotor core. Another advantage of the projected portions may be to further cool down the magnets in the magnet slots. Cooling the magnets may protect against their demagnetization.

20 Claims, 4 Drawing Sheets

(51) Int. Cl.
*F04C 29/04* (2006.01)
*H02K 1/27* (2006.01)

(58) Field of Classification Search
USPC ...... 310/60 A, 61, 64, 75 D, 52, 54, 57, 227
See application file for complete search history.

(56) References Cited

U.S. PATENT DOCUMENTS

| | | | | |
|---|---|---|---|---|
| 7,791,236 B2* | 9/2010 | Liang | ............ | H02K 1/2766 310/156.01 |
| 2005/0140235 A1* | 6/2005 | Yamagishi | ............ | H02K 1/276 310/156.53 |
| 2007/0052313 A1* | 3/2007 | Takahashi | ............ | H02K 1/32 310/156.53 |
| 2009/0015081 A1* | 1/2009 | Takenaka | ............ | H02K 1/2766 310/54 |
| 2009/0045688 A1* | 2/2009 | Liang | ............ | H02K 1/2766 310/156.07 |
| 2010/0194220 A1* | 8/2010 | Tatematsu | ............ | H02K 1/2766 310/61 |
| 2012/0074805 A1* | 3/2012 | Takizawa | ............ | H02K 1/276 310/156.01 |
| 2013/0020889 A1* | 1/2013 | Yamamoto | ............ | H02K 1/2766 310/59 |
| 2013/0038151 A1* | 2/2013 | Ohashi | ............ | H02K 1/32 310/59 |
| 2013/0221772 A1* | 8/2013 | Miyamoto | ............ | H02K 9/19 310/54 |

OTHER PUBLICATIONS

English machine translation for JP 2012-050331.*
English translation of JP 2011097725; Yuki et al.; May 2011; Japan.*
English translation of JP 2006067777; Ogawa et al.; Mar. 2006; Japan.*
English translation of Kaneko et al. JP 2002345188; Nov. 2002; Japan.*
English translation of Nakao Kiyoharu, JP 2007116807; May 2007; Japan.*

* cited by examiner

ROTOR AND A MOTOR AND COMPRESSOR COMPRISING THE ROTOR

CROSS-REFERENCE TO RELATED APPLICATION

This application claims the benefit and priority of Chinese Patent of Invention Application No. 201310043366.2 filed Jan. 24, 2013. The entire disclosure of the above application is incorporated herein by reference.

FIELD OF THE TECHNOLOGY

The present invention relates to a rotor and a motor and compressor comprising the rotor.

BACKGROUND

A motor can convert electric energy into mechanical energy by using a copper coil, also known as stator winding, to produce a rotating magnetic field, which acting on a rotor, forms a rotary torque driven by magnetoelectricity. Motors are widely used in the industries, especially in compressors. However, motor loss has been one of the factors that affect the performance of a motor. Currently, motor loss mostly results from the rotor. When the rotor is running at a high speed, it will generate a large magnetic flux and easily cause a high magnet temperature and demagnetizes the magnet. This may degrade the overall performance of the compressor. Generally, prior art in this field relies on cooler oil flowing through several oil holes in the rotor to reduce the temperature of the rotor magnet to cool the magnet.

SUMMARY

In one embodiment of the rotor, the rotor comprises, a rotor core defining an outer periphery, a bore concentric with a center of the rotor core, a plurality of magnet slots positioned on the outer periphery, and a plurality of oil holes located radially outward from the center between the bore and the magnet slots. Each of the oil holes includes a body portion and at least one projected portion, the projected portion located radially outward from the body portion and positioned between the body portion and the magnet slots.

In a cross section of the rotor taken orthogonally to its center axis, each body portion is bounded between an inner circle boundary, the inner circle boundary capable of being drawn on the cross section concentric with the rotor core and radially outward from the inner bore, and an outer circle boundary, the outer circle boundary capable of being drawn on the cross section concentric with the rotor core and located radially outward from the inner circle boundary and radially inward from the magnet slots. In another embodiment of the rotor, the projected portions extend from the body portion to the magnet slots, and, for each oil hole, the body portion, projected portion, and magnet slots forming an integral oil hole.

In another arrangement of the present disclosure, each oil hole of the rotor includes two projected portions, the two projected portions located on opposing ends of the body portion.

In some embodiments, when looking at the cross section of the rotor core taken orthogonally to the center axis: each magnet slot has a midpoint, each midpoint is located on a diameter which is capable of being drawn through the center of the cross section, each oil hole of the projected portion includes a pinnacle portion having a peak, the peak of the pinnacle located on the diameter and extending to the midpoint of the magnet slot.

In yet other embodiments, each oil hole of the rotor corresponds to a magnet slot. The rotor further comprises the magnet positioned in the said slot. The number of the oil holes in the rotor is equal to or a multiple of the number of magnets.

In another embodiment of this invention, the rotor core has oil holes including the projected portion to increase the area of contact between the cooler oil and the rotor core and facilitate the cooling of the rotor core. Furthermore, the projected portions of the oil holes extend to the magnet slot, so that cooler oil can flow into the magnet slot, enhance the cooling effect of the magnet in the slot, and thus increase the overall performance of the rotor.

Further, this invention discloses a motor comprising the said rotor. The motor located in a compressor. The compressor comprises a hollow shaft and an oil pump, with the shaft located in the bore of the rotor core. The oil pump transmits the oil to the top of the shaft, and the oil flows into the oil holes which are between the shaft and the magnet slots to cool the magnets.

DESCRIPTION OF THE PREFERRED EMBODIMENT

Drawings and embodiments are combined below to describe the technical solution provided in the present invention. Generally, rotor cores are formed from a plurality of stacked laminations. Each lamination is die cut, using a predetermined pattern, and stacked on top of each other to form a cylindrically shaped rotor.

Figure 1:
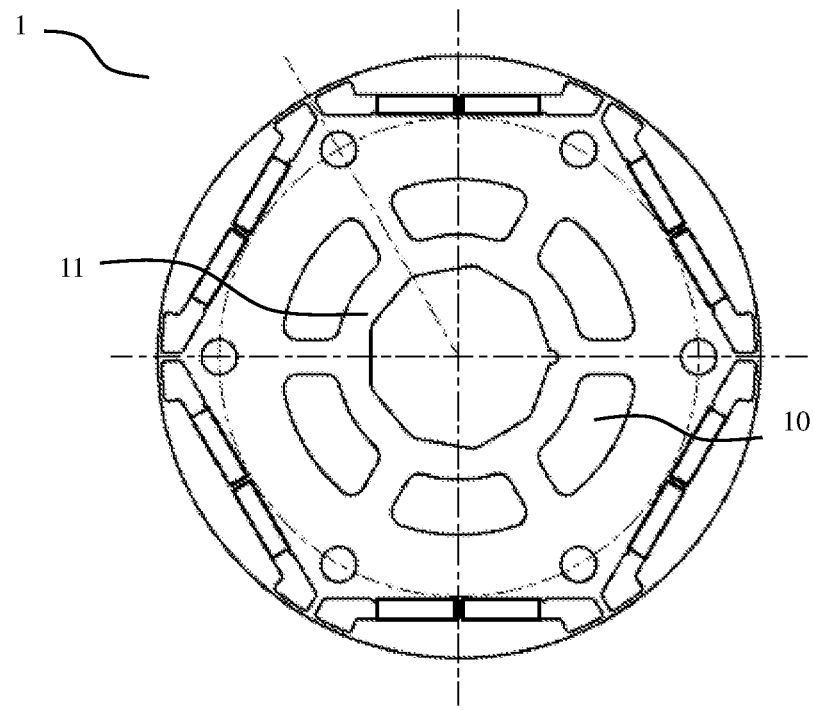
FIG. 1 shows a cross sectional view of a prior art rotor core.

As shown in FIG. 1, a number of oil holes 10 surround the central bore 11 on rotor core 1 of the motor. Each oil hole 10 extends axially through the rotor core 1. During the process of oil circulation, oil flows from the oil sump up through the rotor shaft and onto the surface of the rotor core. As the rotor core rotates, the oil flows into each oil hole and down through the rotor core back into the sump.

Embodiment

Figure 2:
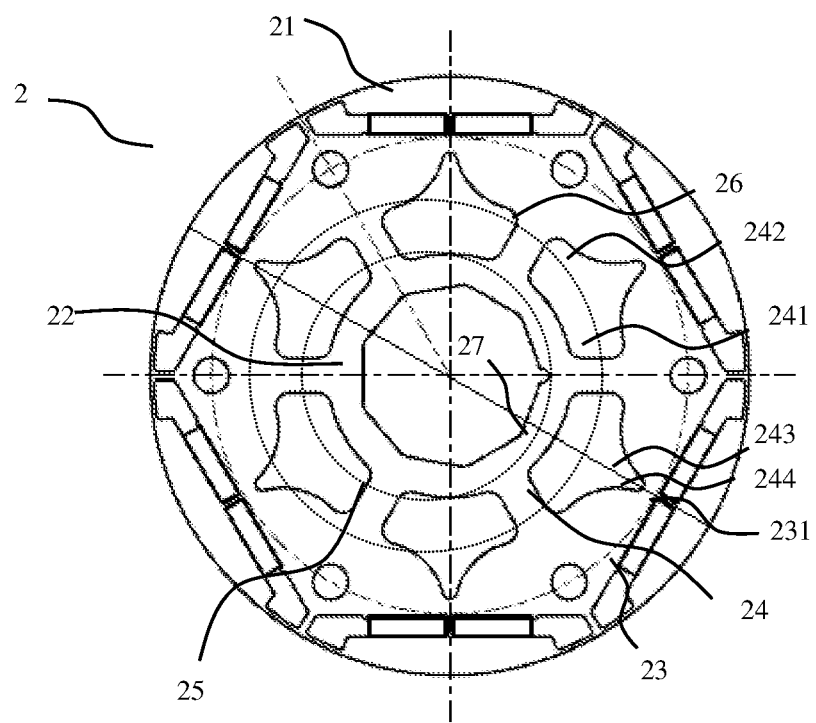
FIG. 2 shows a cross sectional view of one embodiment of the rotor core of the present disclosure.

FIG. 2 illustrates a cross sectional view of rotor core 2 taken orthogonal to its center axis. Because the rotor core 2 is cylindrical, the cross section of the rotor core has a circular shape. The rotor core comprises an outer periphery 21, a bore 22 concentric with a center of the rotor core, a plurality of magnet slots 23 positioned on the outer periphery 21, and a plurality of oil holes 24 located radially outward from the center between the bore 22 and the magnet slots 23.

Each of the oil holes 24 includes a body portion 241 and a projected portion 242 that extends from the body portion 241. The projected portion 242 is located radially outward from the body portion 241 and positioned between the body portion 241 and the magnet slots 23. Specifically, in a cross section of the rotor core 2 orthogonal to its center axis, the body portion 241 is bounded between an inner circle boundary 25 and an outer circle boundary 26. As shown in FIG. 2, the inner circle boundary 25 and the outer circle boundary 26 can be drawn on the cross section concentric with the rotor core 2. It should be understood, however, that there are actually no inner circle boundaries 25 and outer circle boundaries 26 physically on the cross section of the rotor core 2. The boundaries are only used to describe the location of the body portion 241 of the oil hole 24 with respect to the projected portion 242. The magnet slot 23 may contain magnets (not shown in the figure). The projected portions 242 of the oil holes 24 disclosed may increase the surface area available on the rotor to contact oil circulated over the motor. As shown in FIG. 2, for each oil hole 24, the projected portion 242 includes a pinnacle portion 243 having a peak 244. The peak 244 of the pinnacle portion 243 is located on a diameter 27 capable of being drawn through the cross section. Each magnet slot 23 has a midpoint 231, which is located at on one of the diameters 27 of the cross section. The pinnacle 243 of the oil hole 24 extends toward the midpoint 231 of the magnet slot 23. During operation of the compressor, oil flows to the peak 244 of the projected portion 242 of the oil hole 24, thus bringing oil closer to the magnet slot 23.

Figure 3:
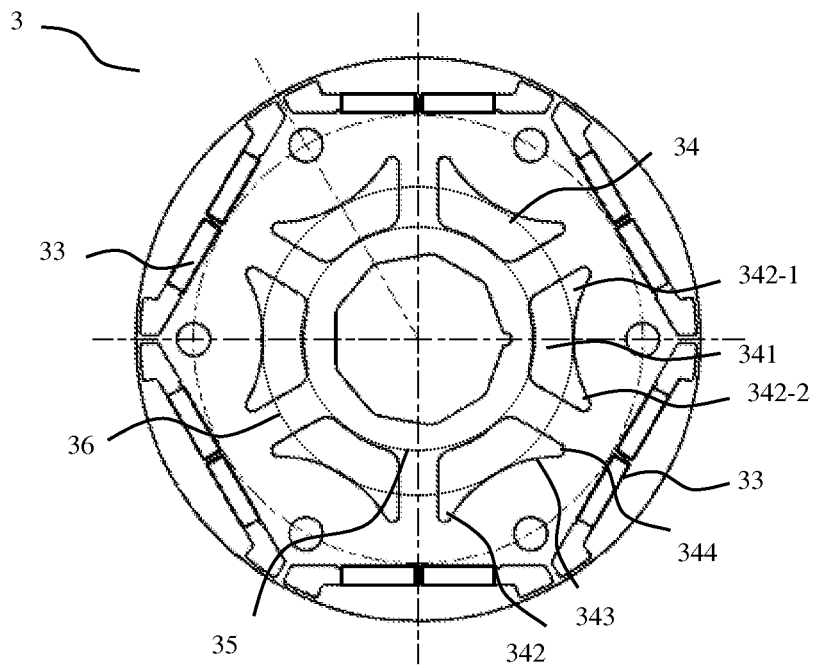
FIG. 3 shows a cross sectional view of another embodiment of the rotor core of the present disclosure.

FIG. 3 illustrates another embodiment of the present disclosure in which each oil hole includes two projected portions. In this embodiment, each of the oil holes 34 includes a body portion 341, a first projected portion 342-1 and a second projected portion 342-2 extends from the body portion 341. The projected portions 342-1 and 342-2 are located on the two ends of the body portion 341 close to the magnet slot 33.

Similar to the embodiment shown in FIG. 2, in a cross section of the rotor core 3 orthogonal to its center axis, the body portion 341 is bounded between an inner circle boundary 35 and an outer circle boundary 36.

Similar to the embodiment shown in the FIG. 2, each of the projected portions 342 comprises a peak 344 with pinnacle 343. The peak 344 extends close to the magnet slot 33. Hence, oil at the peak 344 can further cool the magnet in the magnet slot 33, to protect against demagnetization and enhance the product performance and prolong its service life.

Further, in this embodiment, there is one oil hole 34 for each magnet slot 33 in the rotor core 3. The body portion 341 of the oil hole 34 has at least one projected portion located between the body portion 341 and the magnet slot 33.

Optionally, in another embodiment of rotor core 3, the number of oil holes in the rotor core can be a multiple of the number of magnet slots. The projected portion of each oil hole can extend from the projected body portion close to the magnet slot. Specifically, there are six oil holes in the rotor core shown in the drawing, but the number of oil holes is not limited to six, and can be any even number of groups.

Figure 4:
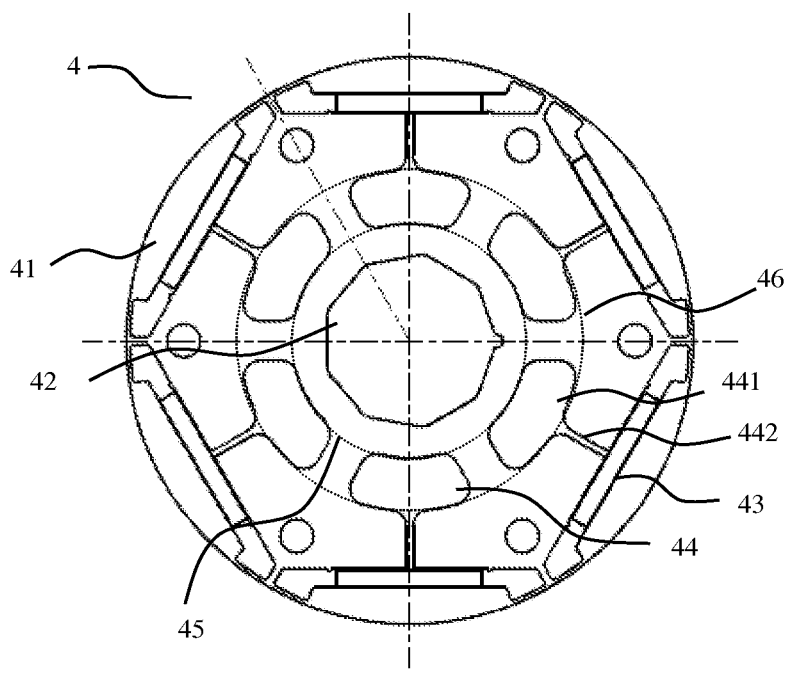
FIG. 4 shows a cross sectional view of another embodiment of the rotor core of this invention.

FIG. 4 illustrates a cross sectional view of rotor core 4 taken orthogonal to its center axis. Because the rotor core 4 is cylindrical, the cross section of the rotor core 4 has a circular shape. The rotor core 4 comprises an outer periphery 41, a bore 42 concentric with a center of the rotor core 4, a plurality of magnet slots 43 positioned on the outer periphery 41, and a plurality of oil holes 44 located radially outward from the center between the bore 42 and the magnet slots 43.

The oil hole 44 comprises a body portion 441 and a projected portion 442 that extends radially outward from the body portion 441 and is positioned between the body portion 441 and the magnet slot 43. Specifically, in the cross section of the rotor core taken orthogonal to its central axis, the body portion 441 is located in the area between an inner circle boundary 45 and an outer circle boundary 46. The oil hole 44 has one projected portion 442.

The projected portion 442 extends from the body portion 441 to the magnet slot 43. Hence, the body portion 441, the projected portion 442 and the magnet slot 43 form an integrated hole. Driven by centrifugal force, the oil in the oil circulation system can flow through the body portion 441 into the magnet slot 43. Therefore, the oil in the magnet slot 43 can better cool the magnet and ideally protect the magnet from demagnetization.

Optionally, in other embodiments of rotor core 4, there can be a multiple number of the oil holes equal to the number of the magnet slots in the rotor core.

Figure 5:
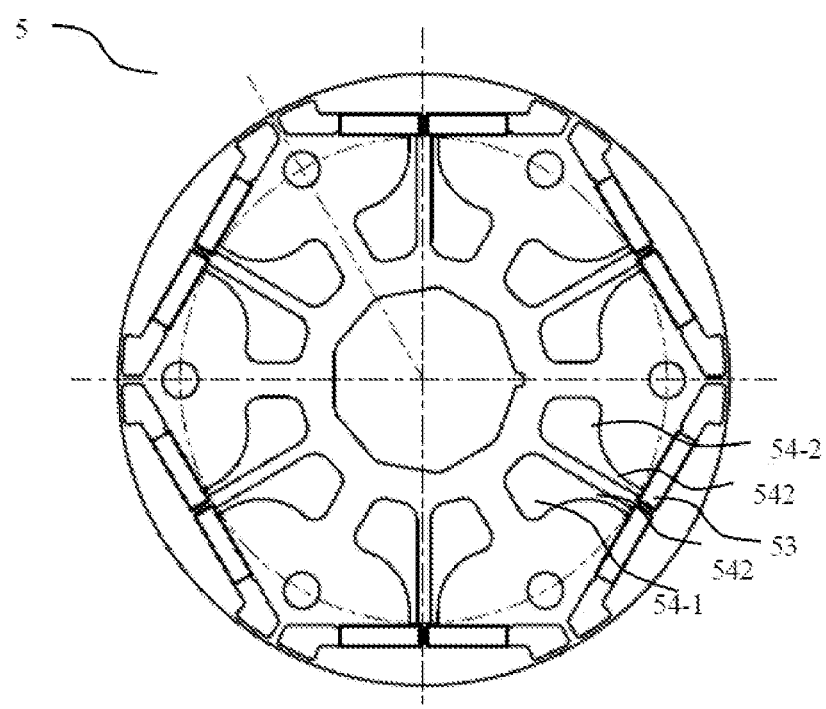
FIG. 5 shows a cross sectional view of another embodiment of the rotor core of this invention.

FIG. 5 illustrates a cross sectional view of rotor core 5 taken orthogonal to its center axis. There are two oil holes 54-1 and 54-2 for each of the magnet slot 53. Each oil hole 54-1, 54-2 has a projected portion 542 connected to the magnet slot 53. Hence, oil in the oil circulation system can enter the magnet slot 53 or come in contact with the magnet to cool it through the projected portion 542 that connects to the magnet slot 53.

Figure 6:
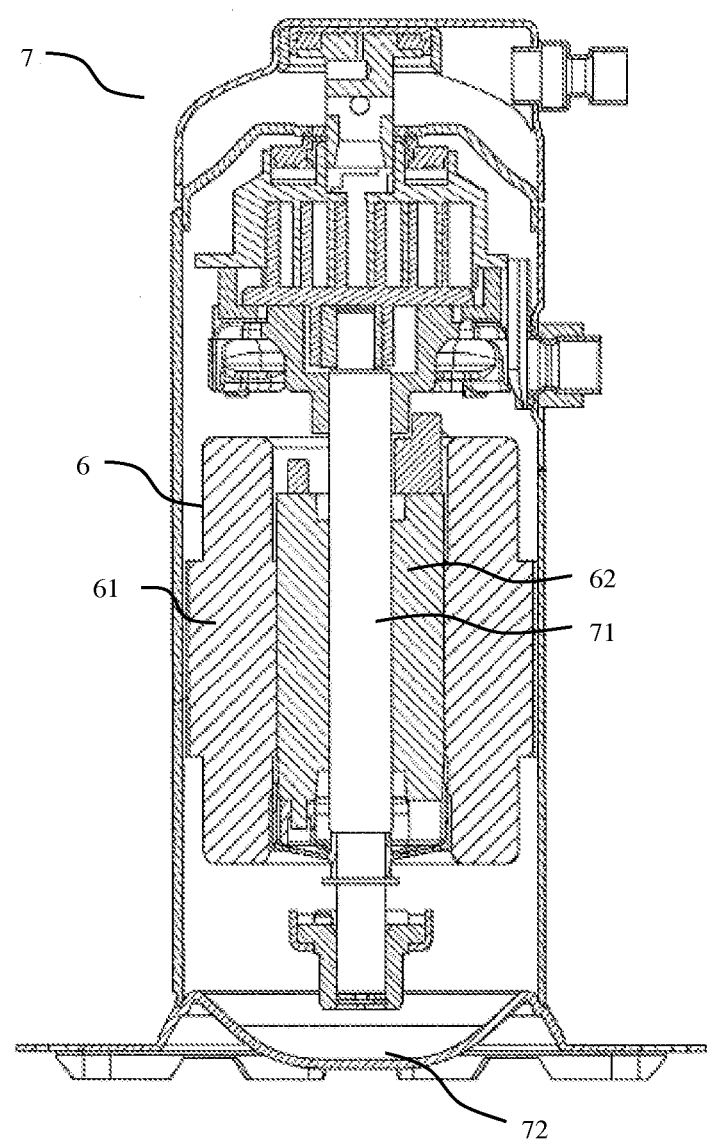
FIG. 6 shows a cross sectional view of a compressor and a motor of this invention.

FIG. 6 illustrates a cross sectional view of a compressor 7 and a motor 6 included by the compressor 7.

The motor 6 comprises the rotor chosen from any of said rotors above.

The motors disclosed in embodiments of this invention include but are not limited to brushless permanent magnet motors.

The compressor 7 comprises a hollow shaft 71, an oil pump, an oil sump that receives the oil 72 and the motor 6. The motor 6 has a stator 61 and a rotor 62, and the rotor 62 chosen from any of said rotor above.

Driven by the oil pump, the oil 72 is transmitted through the shaft 71 and flows to the surface of the rotor core. The oil 72 flows from the rotor core into the oil hole between the shaft and the magnet slot to cool the rotor core and the magnet.

The compressors disclosed in embodiments of this invention include but are not limited to a scroll compressor.

It should be noted that "include", "comprise" or any other variant meant to non-exclusively contain a series of processes, methods, items or devices that comprise elements not explicitly listed in addition to those already covered or all elements inherent in such processes, methods, items or devices. Without further limitations, elements defined by "comprising a . . . " do not exclude other similar elements besides the said elements contained in the processes, methods, items or devices covering.

The foregoing descriptions provide preferred embodiments of the invention and are not intended to limit the coverage of this invention. Any changes, modifications, equivalent replacements or improvements are made to the embodiments without departing from the spirit of the invention and are covered herein.

The invention claimed is:

1. A rotor comprising, a rotor core defining i) an outer periphery extending between opposing surfaces of the rotor core, ii) a bore concentric with a center axis of the rotor core, iii) a plurality of magnet slots positioned on the outer periphery, and iv) a plurality of oil holes configured to receive oil, the plurality of magnet slots each including a midpoint located on a diameter drawn through a center of a cross section taken orthogonal to the center axis of the rotor core, the plurality of oil holes located radially outward from the center between the bore and the magnet slots, each oil hole including a body portion and at least one projected portion having a pinnacle portion with a peak located on the diameter and extending to the midpoint of one of the magnet slots, the body portion and the at least one projected portion of said each oil hole extending from one of the opposing surfaces of the rotor core to the other opposing surface of the rotor core, the at least one projected portion of said each oil hole located radially outward from the body portion and positioned between the body portion and the magnet slots, the entirety of the at least one projected portion of one of the plurality of oil holes extending from the body portion of said one of the plurality of oil holes to a magnet slot of the plurality of magnet slots to allow the body portion and the at least one projected portion of said one of the plurality of oil holes and the magnet slot to form an integral oil hole.

2. The rotor of claim 1, wherein in the cross section of the rotor core, each body portion is bounded between i) an inner circle boundary, the inner circle boundary capable of being drawn on the cross section concentric with the rotor core and radially outward from the bore, and ii) an outer circle boundary, the outer circle boundary capable of being drawn on the cross section concentric with the rotor core and located radially outward from the inner circle boundary and radially inward from the magnet slots.

3. The rotor of claim 2, wherein each of the oil holes corresponds to a magnet slot of the plurality of magnet slots.

4. The rotor of claim 3, characterized in that the rotor further includes magnets fixed in the magnet slots.

5. The rotor of claim 2, further comprising magnets fixed in the magnet slots.

6. The rotor of claim 5, wherein the quantity of the oil holes is equal to or a multiple of the number of magnets.

7. A motor comprising the rotor of claim 2.

8. A compressor comprising the rotor of claim 2, a hollow shaft and an oil pump, the hollow shaft located in the bore of the rotor core, the oil pump configured to transmit the oil to a top of the hollow shaft so that the oil flows into the plurality of oil holes which are between the hollow shaft and the magnet slots to cool the magnets.

9. The rotor of claim 2, wherein the quantity of the oil holes is equal to or a multiple of the number of magnets slots.

10. The rotor of claim 9, wherein each of the oil holes corresponds to a magnet slot of the plurality of magnet slots.

11. The rotor of claim 1, wherein each of the oil holes corresponds to a magnet slot of the plurality of magnet slots.

12. The rotor of claim 11, further comprising magnets fixed in the magnet slots.

13. The rotor of claim 1, characterized in that the rotor further comprising magnets fixed in the magnet slots.

14. The rotor of claim 13, wherein the quantity of the oil holes is equal to or a multiple of the number of magnets.

15. The rotor of claim 14, wherein each of the oil holes corresponds to a magnet slot of the plurality of magnet slots.

16. A motor, comprising the rotor of claim 1.

17. A compressor comprising the rotor of claim 1, a hollow shaft and an oil pump, the hollow shaft located in the bore of the rotor core, the oil pump configured to transmit the oil to a top of the hollow shaft so that the oil flows into the plurality of oil holes which are between the hollow shaft and the magnet slots to cool the magnets.

18. The rotor of claim 1, wherein the quantity of the oil holes is equal to or a multiple of the number of magnet slots.

19. The rotor of claim 18, characterized in that each of the oil holes corresponds to a magnet slot.

20. A motor, characterized in that the motor comprises the rotor of claim 18.

* * * * *